June 29, 1965 C. J. McDOWALL 3,191,732
TORQUE RESPONSIVE CLUTCH WITH LIMITED TORQUE IN ONE DIRECTION
AND UNLIMITED TORQUE IN THE OPPOSITE DIRECTION
Filed Sept. 12, 1960 2 Sheets-Sheet 1

INVENTOR.
Charles J. McDowall
BY
Paul Fitzpatrick
ATTORNEY

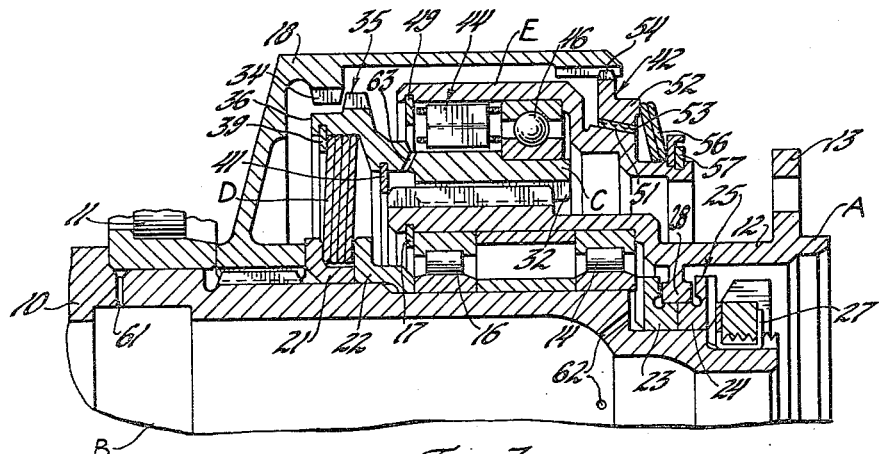

United States Patent Office 3,191,732
Patented June 29, 1965

3,191,732
TORQUE RESPONSIVE CLUTCH WITH LIMITED TORQUE IN ONE DIRECTION AND UNLIMITED TORQUE IN THE OPPOSITE DIRECTION
Charles J. McDowall, Indianapolis, Ind., assignor to General Motors Corporation, Detroit, Mich., a corporation of Delaware
Filed Sept. 12, 1960, Ser. No. 55,262
3 Claims. (Cl. 192—48)

My invention is directed to a type of clutching device which may be termed a safety coupling. A safety coupling is a device to transfer torque from a driving to a driven shaft with provisions for the driven shaft to overrun the driving shaft. It amounts to more than a mere overrunning clutch, however, since it transmits a substantial, although limited, amount of torque from the normally driven shaft to the normally driving shaft without breaking the driving connection and overrunning.

Safety couplings have various uses, but the use to which I refer herein is in coupling gas turbine engines to aircraft propellers. In such installations, the engine and propeller always turn in one direction, and ordinarily the engine drives the propeller. However, under certain circumstances such as a landing glide of an aircraft, the engine may deliver less than zero horsepower and the propeller may extract energy from the air stream (that is, windmill) and contribute substantial power to the engine. This is desirable to provide a controlled and limited braking effect on the aircraft under such circumstances. Delivery of torque from the propeller to the engine may be referred to as reverse torque. Reverse torque is necessary also when the propeller windmills to start the engine. However, the reverse torque must be limited to avoid heavy propeller drag if the engine should fail when the aircraft is in flight. For these reasons, a mere overrunning clutch incapable of transmitting a predetermined significant reverse torque is not acceptable.

I am aware of prior safety coupling installations which embody a dog clutch normally biased into engagement by the axial force generated by helical splines through which torque is transmitted and by springs acting to hold the clutch engaged. Such safety couplings suffer from the disadvantage that, if the power plant fails and the propeller overruns, the parts of the clutch ratchet against each other and, unless the propeller is immediately stopped, the safety coupling may be seriously damaged and must be inspected after each overrun.

The purpose of my invention, therefore, is to provide a mechanism which will transmit unlimited torque (within the capacity of the power plant) in one direction and limited torque, sufficient to provide desired control of an aircraft or to start the power plant, in the other direction, but which will uncouple upon transmission of reverse torque of an undesirably high level. A further object is to provide such a coupling that is not damaged or hazarded by the overrunning action, and which will reengage smoothly after disengagement if the direction of torque again becomes normal. It is a further object to provide such a mechanism which is light in weight and compact and well suited to the requirements of aircraft installations. However, while the invention has been conceived in response to the needs of aircraft installations, it is capable of use in other situations.

The nature of the invention and the advantages thereof will be apparent to those skilled in the art from the succeeding detailed description of the preferred embodiment of the invention and the accompanying drawings thereof.

FIGURE 3 is a partial view similar to FIGURE 1 illustrating the coupling in its disengaged condition.

FIGURES 4 and 5 are fragmentary views illustrating the action of the overrunning clutch.

FIGURE 6 is a load-deflection curve of the clutch control springs.

Figure 1:
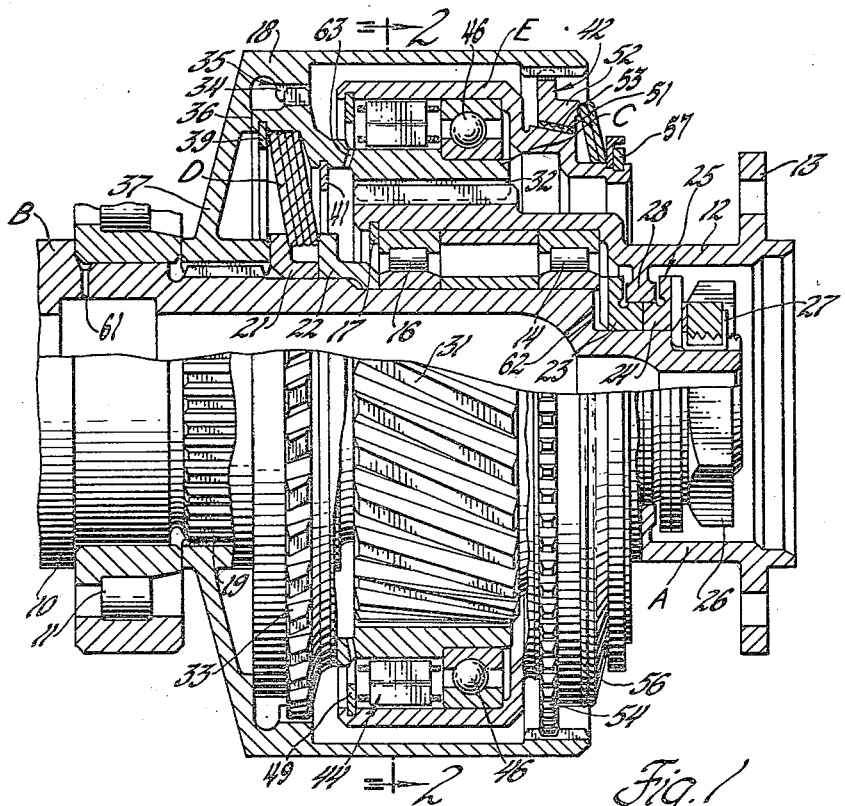
FIGURE 1 is a view of a safety coupling with parts cut away and in section on a plane containing the axis of rotation of the coupling.

By way of introduction to the more detailed description of the safety coupling, it may be pointed out that it comprises a first rotatable member A which normally is a power input member directly coupled to the power plant, a second member B coaxial with the first member which normally is coupled to the propeller, and a third or intermediate member C which is coupled to the input member A by helical splines and to the output member B by a positive or dog type clutch which is released to disengage the coupling. Torque transmitted in the normal direction from member A to member B acts through the splines to clutch the intermediate member C to the output member B, while reverse torque acts to disengage members B and C. Spring means D comprises a stack of Belleville springs with an overcenter action tending to hold the dog clutch either engaged or disengaged. To reengage the coupling when it has been disengaged, there is provided a control member E which is coupled to the output member B by a constantly engaged friction or drag clutch and to the intermediate member C by a one-way or overrunning clutch.

If, because of failure of the power plant or other reason, the output member B transmits sufficient torque to member A, the force generated by the helical splines overcomes the force of spring D and declutches members C and B. The member B may continue to rotate without any load and member A may become stationary. Control member E rotates with the output member B but transmits no torque to the intermediate member C because the one-way clutch overruns. However, if the power plant is restarted and the speed of shaft A comes up to that of shaft B, the intermediate member C turns in the opposite direction with respect to the output member and the overrunning clutch transmits torque from control member E to intermediate member C which biases the dog clutch to close, overcoming the overcenter action of spring D. The torque so transmitted is limited to a safe and relatively low value by the drag clutch between members B and E. The drag clutch may slip to provide alignment of the positive clutch splines.

Proceeding to the detailed description of the structure, the output member B includes a shaft 10 mounted in a roller bearing 11 and a second bearing (not illustrated) in any suitable housing such as an aircraft engine reduction gear case. The input member A comprises a shaft 12 having a flange 13 by which it is coupled to the engine. Shaft 12 is rotatably supported on shaft 10 by roller bearings 14 and 16 separated by suitable spacers. The outer races of the bearings and the intermediate spacer are retained between an internal shoulder of the shaft 12 and an expanding snap ring 17. Shaft 10 mounts a cup-shaped outer sleeve 18 forming part of the output member, which is nonrotatably connected to shaft 10 by splines 19.

The bearing 11, the hub of sleeve 18, two spring retainers 21 and 22, the inner race of bearing 16, a spacing sleeve, and the inner race of bearing 14 are assembled in abutting relation in the order named on shaft 10 with bearing 11 abutting a shoulder on the shaft. Two annular bearing rings 23 and 24 forming part of a thrust bearing 25 are mounted between the inner race of bearing 14 and a retaining nut 26 having a locking tab washer 27. The shaft 12 includes an inwardly directed flange 28 fitting between the rings 23 and 24 to provide the thrust bearing 25 between the two shafts.

Figure 2:
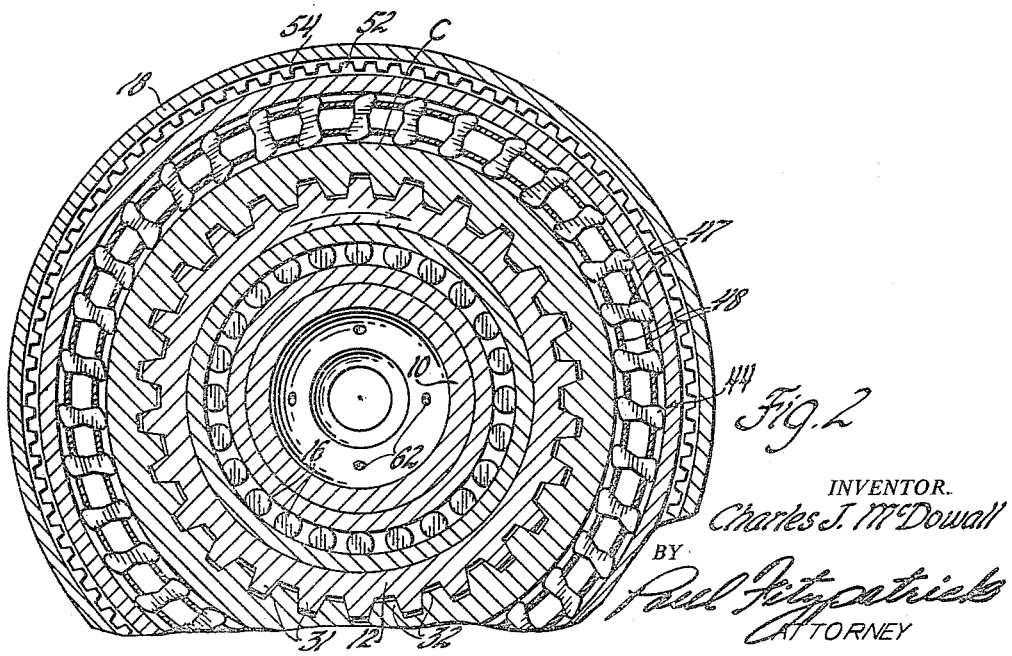
FIGURE 2 is a cross-sectional view of the same taken on the plane indicated by the line 2—2 in FIGURE 1.

External helical splines 31 on shaft 12 engage internal helical splines 32 on control member C. These splines may be pitched at approximately 25 degrees. The parts rotate in a clockwise direction as illustrated in FIGURE 2, and the normal direction of torque is from member A to member B, that is, from shaft 12 to shaft 10. This torque is transmitted through the splines 31, 32, and, for such clockwise rotation, the splines are right hand. Intermediate member C is provided with external splines 33 which normally engage internal splines 34 on sleeve 18. These splines are disengageable and provide the positive or dog clutch 35 between intermediate member C and the output member B. Preferably, the splines 33, 34 are pitched left hand so that normal torque acting upon these splines tends to hold the clutch engaged. When the clutch is engaged, the forward edge 36 of member C engages the rear face of the web 37 of sleeve 18.

The dog clutch 35 is biased by the spring means D comprising a stack of four Belleville springs which are received in a recess in the intermediate member C and retained by snap ring 39. The inner margins of the springs are received between the flanges of retainer rings 21 and 22. As the clutch 35 is disengaged, the springs go overcenter and are coned in the opposite direction as illustrated in FIGURE 3, thus providing a force acting against intermediate member C to hold the clutch 35 disengaged. This is illustrated also by the load against deflection curve of the spring in FIGURE 6. It will be noted that the force tending to engage the clutch is greater than that tending to hold it disengaged, and acts over a somewhat longer range of travel. The magnitude of the force tending to hold the clutch engaged should be such as to provide for the transmission of the desired value of reverse torque, but to allow the clutch to disengage when this desired limit is exceeded.

The disengaging movement of intermediate member C is limited by a snap ring 41 which engages the forward end of shaft 12. Once the clutch 35 is disengaged, no force tending to reengage the safety coupling can be transmitted through this clutch. Reengagement is provided for by the control member or sleeve E which forms a part of what may be described generally as unidirectional friction clutch means coupling the output member B to the intermediate member C. This clutch means comprises a friction or drag clutch 42 and a one-way, overrunning, or sprag clutch 44, the two cooperating to provide for transmission of torque in one direction only and for limiting the torque so transmitted to a suitable value to effect reengagement of the dog clutch.

The control member E is an annular body rotatably mounted upon the intermediate member C by a ball bearing 46 which may be pressed into engagement with shoulders on these members. The unidirectional clutch may be of any suitable type; as illustrated, it comprises an annular array of sprags 47 in a cage 48 acting against the precisely finished inner surface of member E and outer surface of member C. FIGURE 4 shows the sprags in driving engagement, FIGURE 5 released due to overrun of the outer member E. The sprag clutch is retained by a snap ring 49. The control member comprises a conical clutch surface 51 upon which is mounted a clutch ring 52 having suitable friction facing 53 on its inner surface. Clutch ring 52 is non-rotatably coupled to the sleeve 18 by a set of splines 54 which allow the ring 52 to move axially of sleeve 18 when the intermediate member C and control member E shift axially upon disengagement and engagement of clutch 35. A pair of Belleville springs 56 piloted on the control memmer C and retained by a snap ring 57 engage the rear face of clutch ring 52 to provide a constant axial force and thereby a constant frictional drag or torque limit on the friction clutch.

Oil may be introduced by a suitable means through the end of the hollow shaft 10 and be discharged through ports 61 to lubricate bearing 11 and through ports 62 and 63 to flow past the thrust bearing, roller bearings, splines, and other mechanism of the coupling.

It should be understood that either member A or B of the clutch may be the input member and reference to member A as the input member is strictly for convenience. With this in mind, the operation of the clutch may be reviewed briefly, assuming for purpose of illustration that a gas turbine engine is coupled to member A and a propeller to member B. In the normal drive of the propeller, as shown in FIGURE 1, torque is transmitted from shaft 12 through splines 31, 32, member C, positive clutch 35, sleeve 18, and shaft 10. Now if we assume that the power output of the engine gradually decreases and the propeller continues to rotate due to forward motion of the aircraft, at some point the torque diminishes to zero; and, as engine power output further decreases, torque increases in the negative direction and member B will be driving member A. The torque transmitted through splines 31, 32 now creates an axial thrust tending to shift member C to the right to the position shown in FIGURE 3. This thrust is aided by the helical splines 34 of the dog clutch and is resisted by the Belleville spring stack D. At some value of torque which, for example, may be one-tenth of the torque corresponding to full engine power output, the thrust overcomes the Belleville springs. As soon as the springs go over the peak P of the load curve as illustrated in FIGURE 6, the spring resistance decreases and the clutch rapidly moves to open position. In the latter stages of this movement, the spring acts to move the member C so as to open the clutch and hold it open. The positive coupling is thus completely released, and the engine cannot load the propeller. Members A and C rotate together and members B and E rotate together. There are no ratcheting parts, and there is only slight sliding friction between the relatively rotating parts, which are lubricated. The drag clutch 42 does not slip, since the overrunning clutch 44 allows control member E to revolve with sleeve 18.

Now if we assume that the propeller is stopped and the engine is cranked, or the propeller continues to rotate at normal speed and the engine is restarted and brought up to speed, the rotational speed of member A will again approach that of member B. As soon as member A turns very slightly faster than member B, the intermediate member C turns in such a direction with respect to control member E that the sprag clutch 44 locks up and torque is transmitted from member C through clutch 44 and friction clutch 42 to sleeve 18. This torque is in such a direction and of such magnitude that, acting through helical splines 31, 32, it generates an axial force which will overcome the Belleville springs and shift the member C to reengage the positive clutch 35. When the springs D go overcenter, they provide a very considerable engaging force. The parts are now recoupled and will remain so until any recurrence of excess reverse torque. Clutch 42 assists in synchronizing the input and output to facilitate engagement of the positive clutch.

The detailed description of the preferred embodiment of the invention to explain the principles thereof is not to be considered as limiting or restricting the invention. Many modifications may be made by the exercise of skill in the art within the scope of the invention.

I claim:

1. A safety coupling comprising, in combination, first and second relatively rotatable members, a third member having a positive bidirectional clutch connection with the second member disengageable by axial movement of the third member, a torque-transmitting connection between the first member and the third member biasing the positive clutch into and out of engagement in response to the direction of torque between the first and third members only, means biasing the third member in both directions away from an intermediate position between those of engagement and disengagement of the positive clutch, and one-way clutch means coupling the second and third members adapted to transmit torque between the second and third members in the direction to actuate the said connection between the first and third members to engage the positive clutch.

2. A safety coupling comprising, in combination, first and second relatively rotatable members, a third member having a positive bidirectional clutch connection with the second member disengageable by axial movement of the third member, a screw-type torque-transmitting connection between the first member and the third member biasing the positive clutch into and out of engagement in response to the direction of torque between the first and third members only, means biasing the third member in both directions away from an intermediate position between those of engagement and disengagement of the positive clutch, and clutch means comprising a friction slip clutch and a one-way clutch in series coupling the second and third members effective to transmit torque up to a predetermined substantial value between the second and third members only in the direction to actuate the said connection between the first and third members to engage the positive clutch.

3. Clutch mechanism comprising, in combination, first and second members mounted for rotation about a common axis, an intermediate member, helical spline means coupling the intermediate member to the first member for reciprocation along said axis, positive bidirectional clutch means between the intermediate and second members releasable by axial movement of the intermediate member, overcenter force Belleville spring means biasing the intermediate member to hold the clutch engaged when engaged and disengaged when disengaged, unidirectional clutch means and a slippable friction clutch coupling the intermediate member to the second member, the unidirectional clutch means being disposed to transmit torque from the second member to the intermediate member in the direction to act through the said helical spline means to engage the positive clutch.

References Cited by the Examiner

UNITED STATES PATENTS

| | | |
|---|---|---|
| 1,618,479 | 2/27 | Schull. |
| 2,068,869 | 1/37 | Rauen. |
| 2,181,541 | 11/39 | Barkelj. |
| 2,343,312 | 3/44 | Maurer. |
| 2,399,568 | 4/46 | Peterson et al. |
| 2,728,252 | 12/55 | Connell _____ 192—56 X |
| 2,750,019 | 7/56 | Ferris _____ 192—45.1 |

FOREIGN PATENTS 354,711   8/31   Great Britain.

DAVID J. WILLIAMOWSKY, *Primary Examiner.*
THOMAS J. HICKEY, *Examiner.*